March 18, 1958 J. B. TIEDEMANN 2,827,547
APPARATUS FOR WELDING VEHICLE FRAMES
Filed May 20, 1955 7 Sheets-Sheet 1
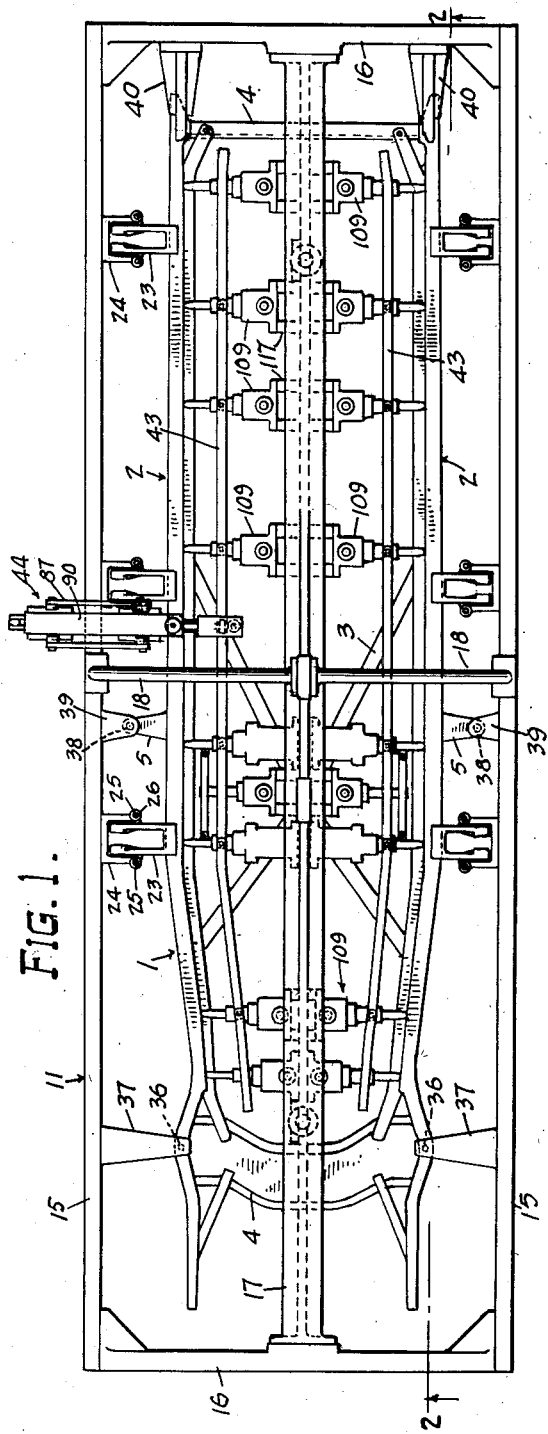
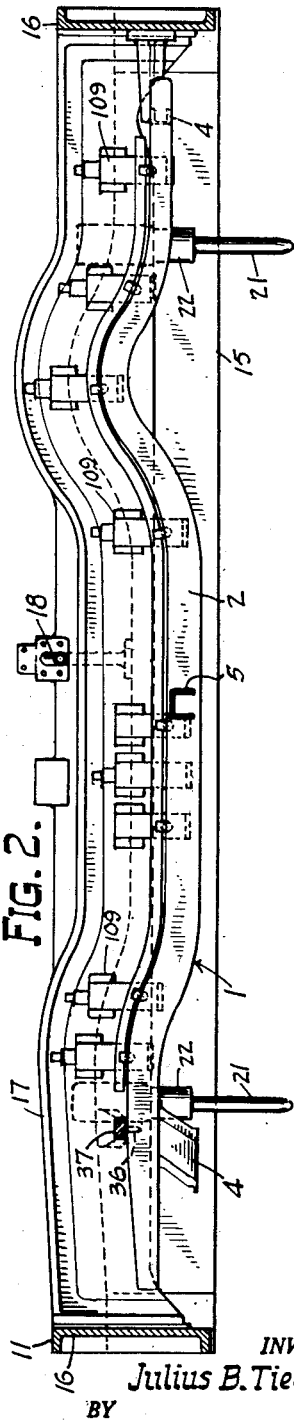
INVENTOR.
Julius B. Tiedemann
BY
ATTORNEYS.

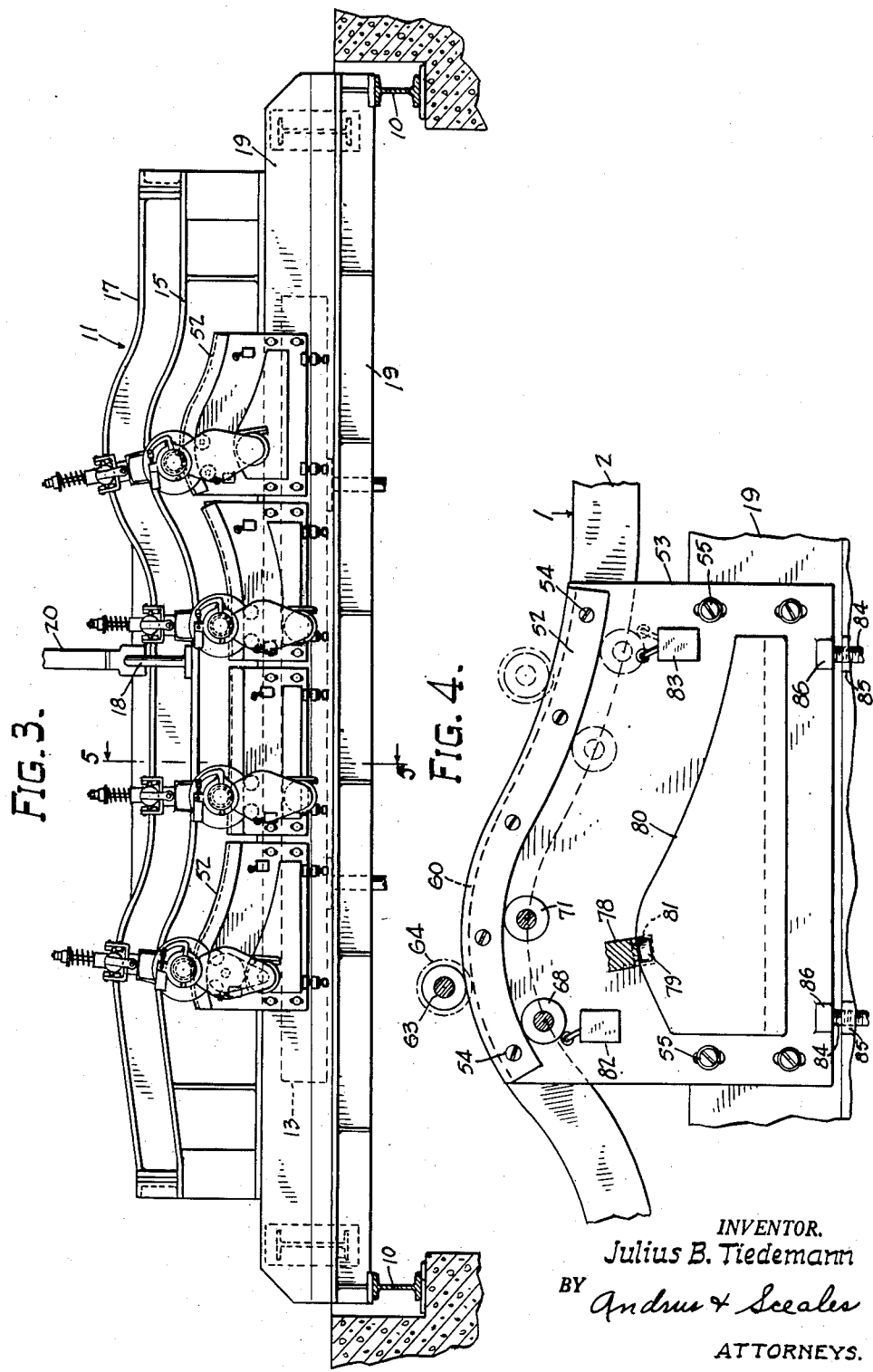

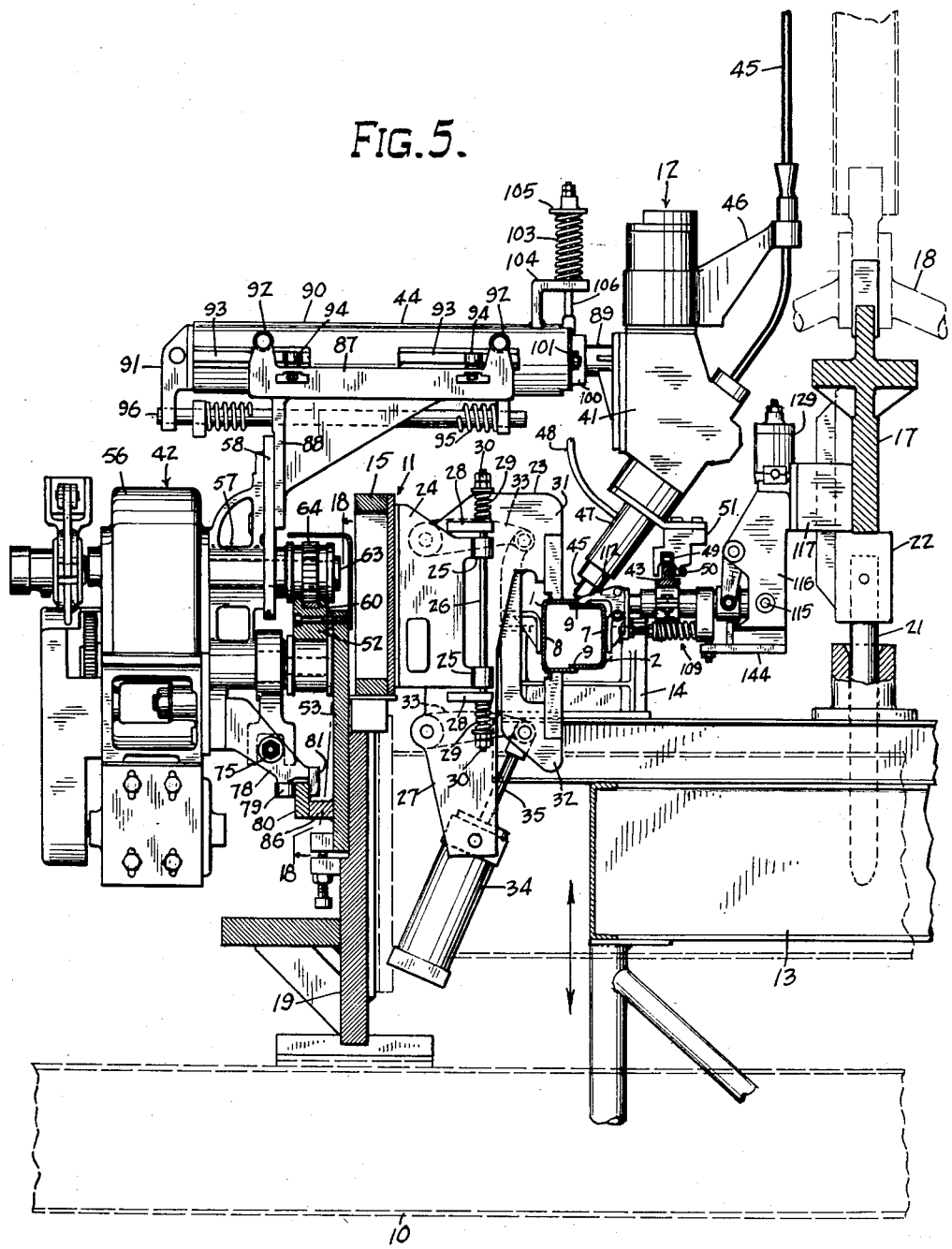

March 18, 1958 J. B. TIEDEMANN 2,827,547
APPARATUS FOR WELDING VEHICLE FRAMES
Filed May 20, 1955 7 Sheets-Sheet 4
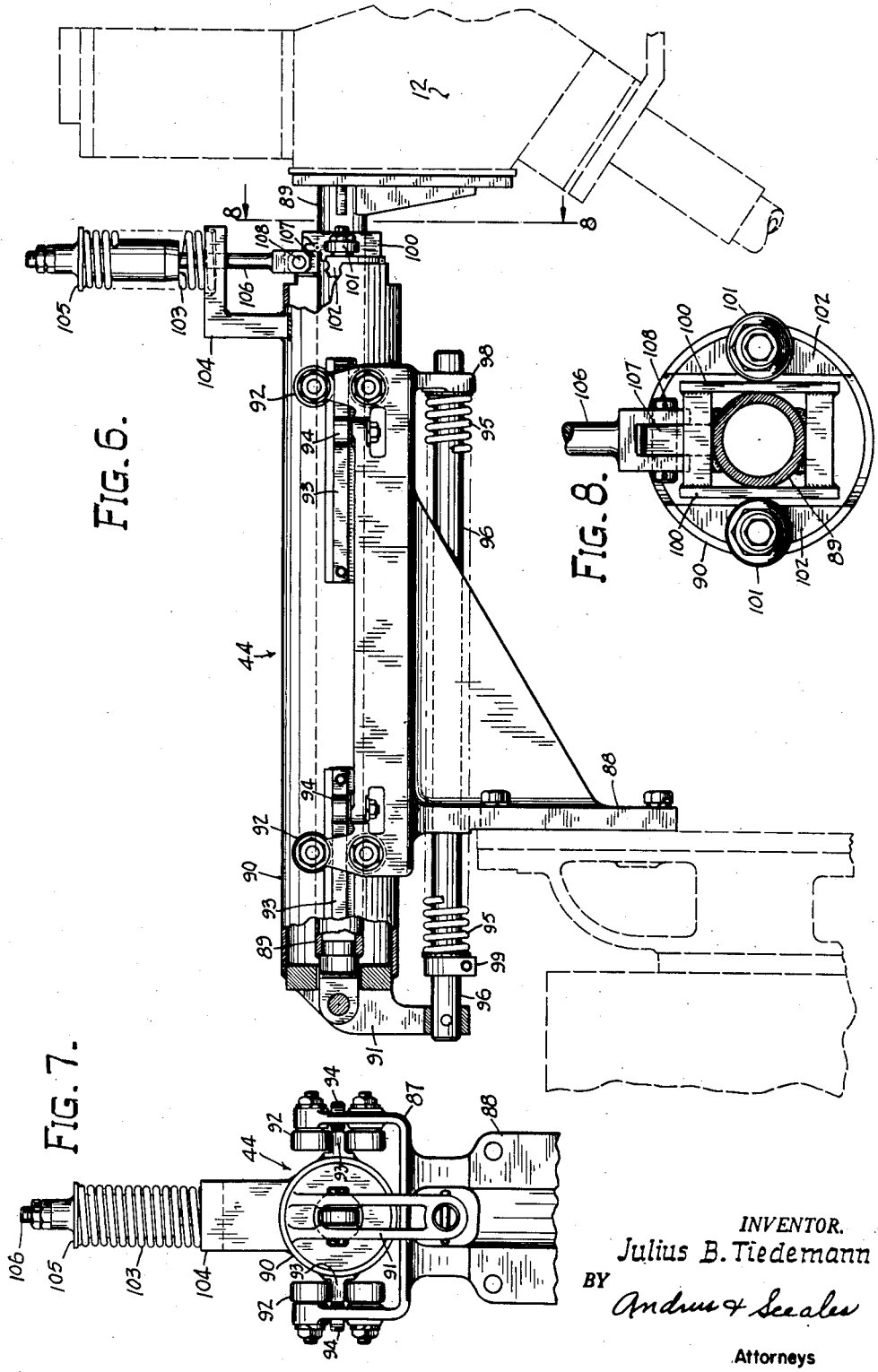
INVENTOR.
Julius B. Tiedemann
BY
Andrus & Seeales
Attorneys March 18, 1958  J. B. TIEDEMANN  2,827,547
APPARATUS FOR WELDING VEHICLE FRAMES
Filed May 20, 1955  7 Sheets-Sheet 5
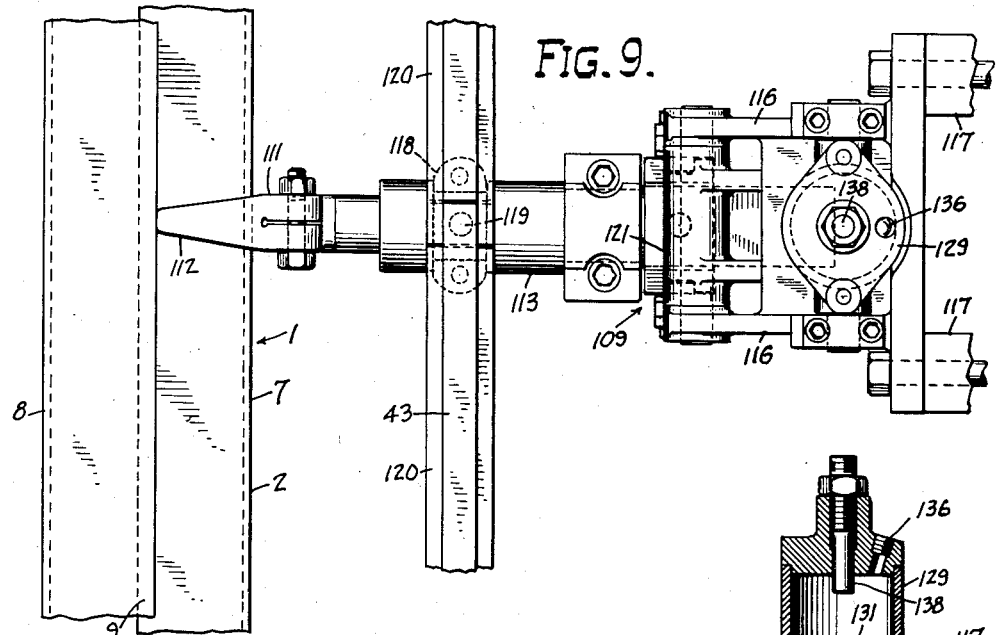
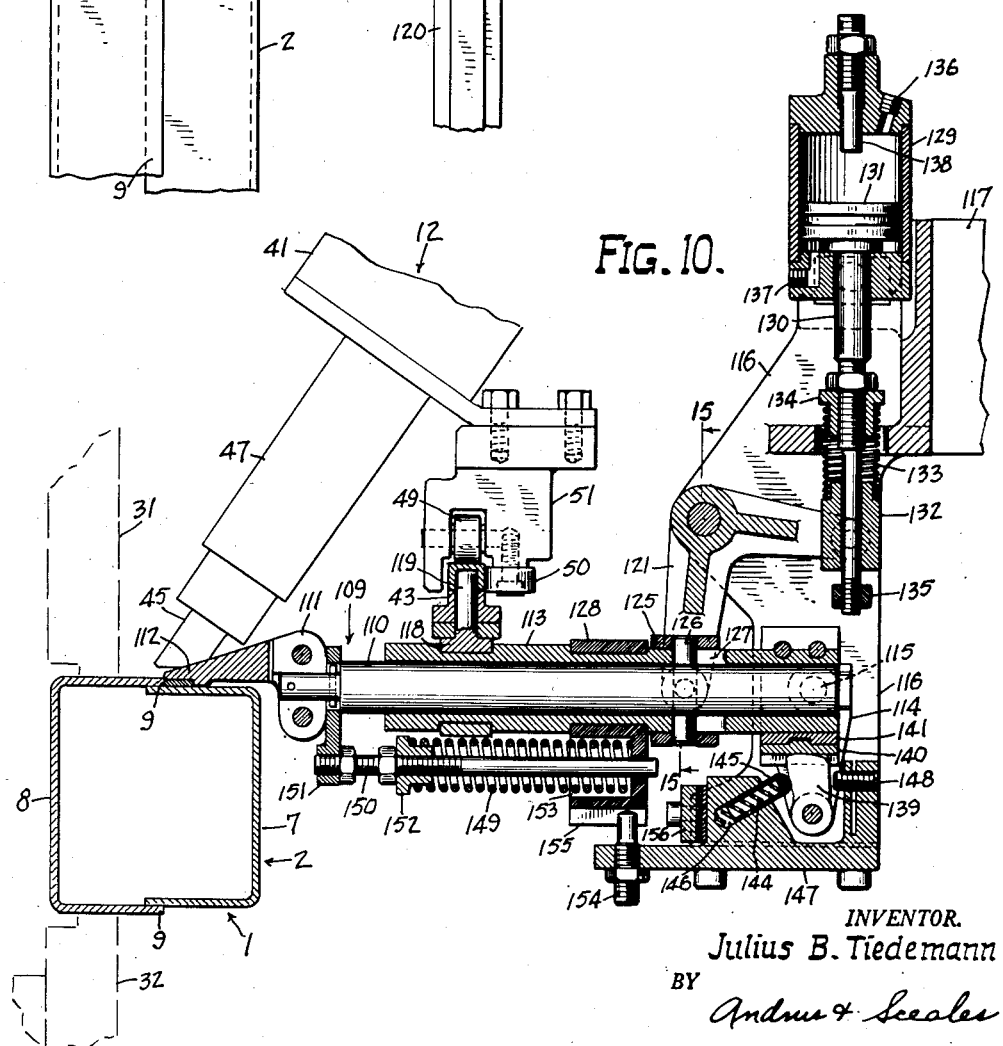
INVENTOR.
Julius B. Tiedemann
BY
*Andrus & Sceales*
ATTORNEYS.

March 18, 1958   J. B. TIEDEMANN   2,827,547
APPARATUS FOR WELDING VEHICLE FRAMES
Filed May 20, 1955   7 Sheets-Sheet 6
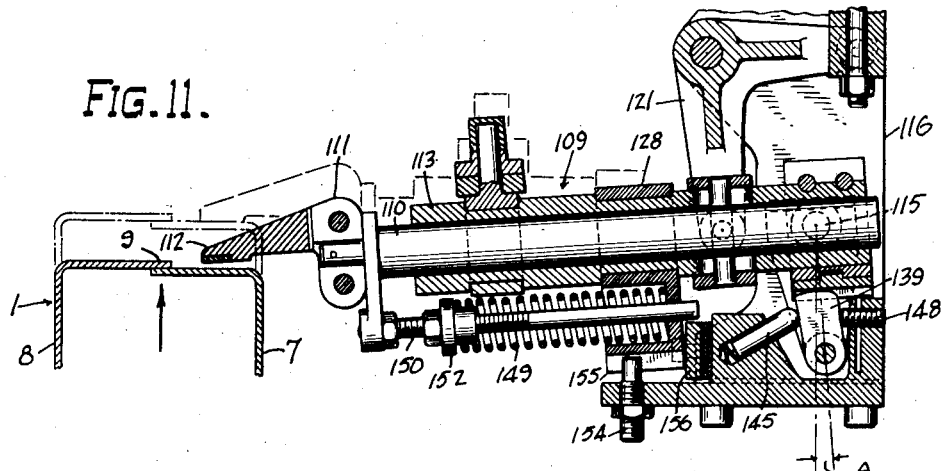
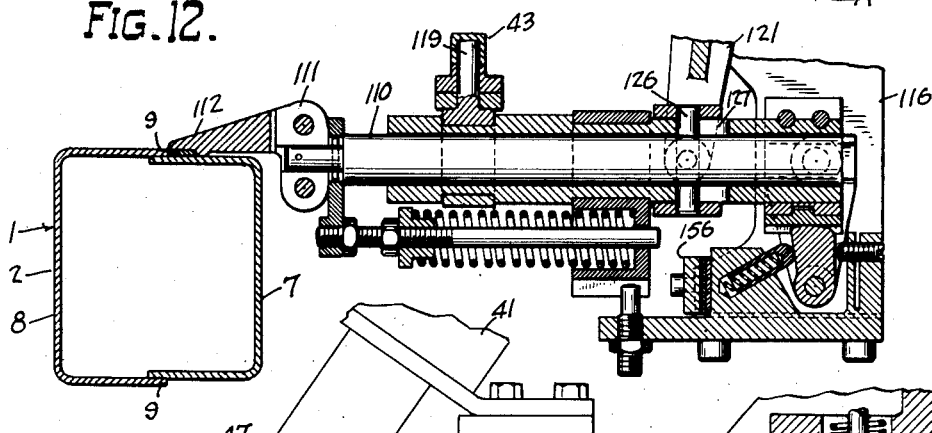
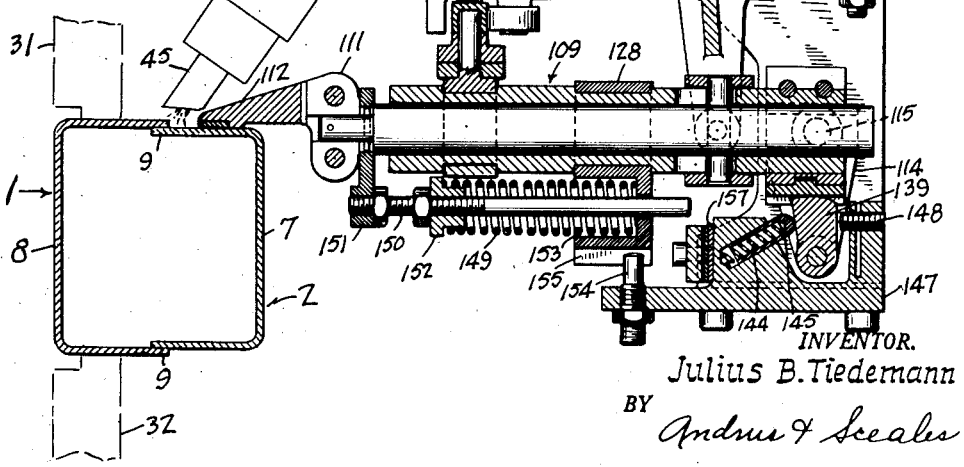
INVENTOR.
Julius B. Tiedemann
BY
Andrus & Sceales
ATTORNEYS.

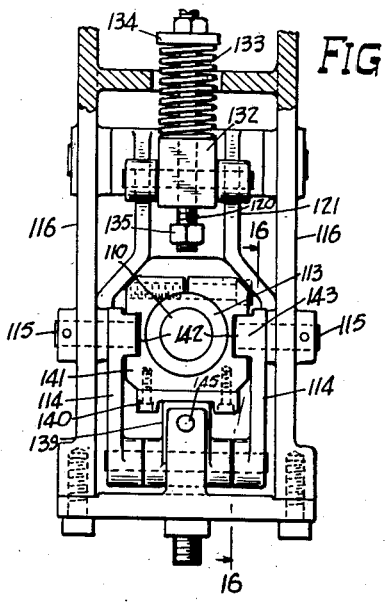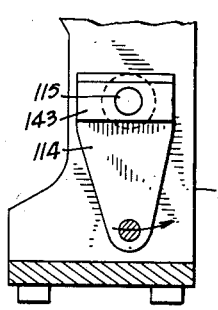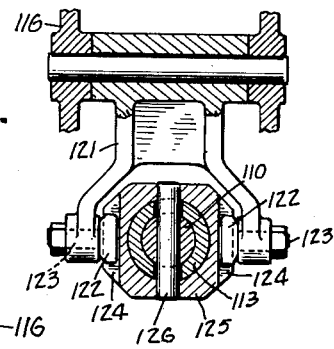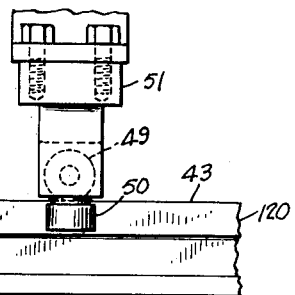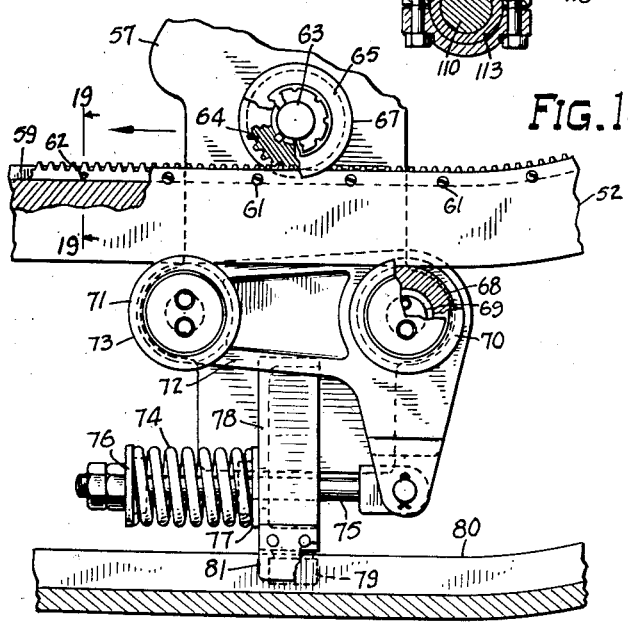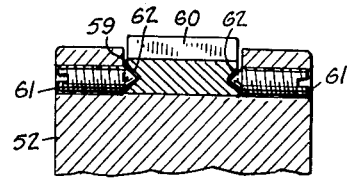

United States Patent Office 2,827,547
Patented Mar. 18, 1958

2,827,547

APPARATUS FOR WELDING VEHICLE FRAMES

Julius B. Tiedemann, Milwaukee, Wis., assignor to A. O. Smith Corporation, Milwaukee, Wis., a corporation of New York Application May 20, 1955, Serial No. 509,782

26 Claims. (Cl. 219—125)

This invention relates to an apparatus for welding, and more particularly to an apparatus for automatically welding the longitudinal seam of the side rails of a vehicle frame.

A vehicle frame, such as that for automobiles, consists generally of a pair of side rails which extend the length of the vehicle and which are connected by a series of cross-members and end supports to provide a rigid structure. The side rails are provided with two upwardly offset or kicked-up portions which conform to the wheel-supporting structure of the vehicle. In cross section the side rails may be generally box-shaped and as such, each is formed from a pair of channel members which are disposed facing each other. One of the channel members has a larger web than the other channel member to permit the flanges of the members to be partially overlapped and provide a seam between the members which extends the length of the side rail.

The present invention is directed to an apparatus for automatically aligning and welding the longitudinal seam on the side rails of a vehicle frame.

The apparatus comprises a welding fixture which receives and aligns the frame for welding. A series of welding heads are aligned with each side rail and are adapted to weld a given length of the seam on the side rail. Each welding head is connected to an individual drive unit which travels on a rail having a contour corresponding to the longitudinal curvature of the side rail and thereby moves the corresponding welding head along the seam to weld the same.

However, as each side rail is apt to have bends or other irregularities which depart from the theoretical contour, provision is made for each welding head to follow these irregularities in the seam on the side rail. This is accomplished by a plurality of finger units which carry a flexible track. The finger units engage the seam to be welded and bend the track in conformity with the same, thereby insuring that the track is a given distance from the seam throughout the length of the seam.

Each welding head is adapted to ride on the track and is connected to the corresponding drive unit such that the welding head is permitted to move freely in a lateral direction to the seam to follow irregularities in the seam as indicated by the track and is permitted to pivot freely in a vertical direction to follow vertical irregularities in the seam as indicated by the track.

The present construction provides a rapid and automatic method of welding the longitudinal seam on the side rail of a vehicle frame. The welding of the side rails is accomplished automatically by a series of welding heads each of which welds a given length of the side rail. Even though the side rail has a generally curved contour, the welding heads are maintained at the proper welding angle to the seam at all times and the welding is done, generally, in a downhand position.

To insure that the welding heads will always be in proper welding position with relation to the seam to be welded regardless of any bends, irregularities or defects which may be present in each individual side rail, the welding heads are automatically aligned in both lateral and vertical directions with the seam to be welded by a series of finger units.

The drawings illustrate an apparatus for automatically welding the longitudinal seam on the side rails of a vehicle frame.

In the drawings:

Figure 1 is a top plan view of the apparatus of the present invention;

Fig. 2 is a vertical section taken along line 2—2 of Figure 1;

Fig. 3 is a side elevation of the apparatus;

Fig. 4 is an enlarged fragmentary side elevation of a portion of the apparatus shown in Fig. 3 and illustrating the movement of the drive unit on the rail;

Fig. 5 is a fragmentary vertical section of the apparatus taken along line 5—5 of Fig. 3;

Fig. 6 is a side elevation of the welding head supporting mechanism;

Fig. 7 is an end view of the structure shown in Fig. 6;

Fig. 8 is a sectional view taken on line 8—8 of Fig. 6;

Fig. 9 is a top plan view of a finger unit and a portion of the track;

Fig. 10 is a vertical section of a finger unit;

Fig. 11 is a view similar to Fig. 10 with the finger unit being in the downwardly inclined position;

Fig. 12 is a view similar to Fig. 10 with the finger unit shown in engagement with the seam to be welded;

Fig. 13 is a view similar to Fig. 10 with the finger unit retracted from the seam;

Fig. 14 is a rear end view of the finger unit with parts broken away and sectioned;

Fig. 15 is a transverse section taken on line 15—15 of Fig. 10;

Fig. 16 is a fragmentary vertical section taken on line 16—16 of Fig. 14;

Fig. 17 is a side elevation of the track with parts broken away and sectioned and showing the attachment of track sections;

Fig. 18 is a vertical section taken on line 18—18 of Fig. 5 and showing the triangular support for the drive unit; and Fig. 19 is a transverse fragmentary section taken on line 19—19 of Fig. 18.

The vehicle frame 1, as best shown in Figs. 1 and 2, is of a conventional construction and consists of a pair of side rails 2 which are connected together by cross braces 3 and end braces 4 to provide a rigid structure. A series of body brackets 5 are secured to the outer surface of each side rail and serve to support the vehicle body. The side rails 2 are provided with bent or kicked-up portions 6 which permit the frame to conform to the wheel supporting structure of the vehicle.

Each side rail 2 has a generally box-shaped cross section and is formed of a channel-shaped inner rail 7 and a channel-shaped outer rail 8 which are disposed with the open side of the channels facing toward each other. The outer rail is provided with a larger web portion so that the flanges of the outer rail will overlap a portion of the inner rail flanges and provide a lap seam 9 on both the upper and lower surfaces of each side rail.

The present invention is directed to apparatus for welding spaced lengths of the seams 9 of the side rails 2. Subsequently in the fabrication or assembly of the frame 1, the intermediate lengths of seams 9 are welded and the seams on the lower surface of the side rails are welded by similar apparatus to provide a continuous weld of the seams.

The apparatus for welding the seams 9 consists generally of a supporting structure 10 which supports a welding fixture 11. The welding fixture 11 serves to align and clamp the frame 1 in welding position and carries a series of welding units 12 for each side rail. The welding units 12 are adapted to travel along the respective side rail and weld spaced lengths of the seam 9 on the upper surface thereof.

The frame to be welded is moved into the welding fixture 11 by a lifting platform 13. The platform 13 carries a plurality of upstanding cup-shaped guides 14 which receive and hold the side rails 2. The platform 13 is raised and lowered by a mechanism, not shown, to elevate the frame into the welding fixture 11 prior to welding and to lower the frame from the fixture after welding.

The welding fixture 11 as best seen in Figs. 1 and 2, consists of a pair of spaced side plates 15 which are connected at their ends by a pair of end plates 16. A center plate 17 is disposed centrally of side plates 15 and extends longitudinally between end plates 16. A pair of cross braces 18 connect the center plate and the side plates at their mid portions to complete the frame structure. The side plates 15 are connected to support plates 19 which rest on the supporting structure 10.

Additional support is given to the welding fixture 11 by strap 20 which interconnects center plate 17 and the roof of the building in which the apparatus is housed.

The vehicle frame 1 is aligned within fixture 11 by a pair of downwardly extending dowels 21, each of which is secured to a plate 22 which is attached to center plate 17. The dowels 21 extend a considerable distance beneath the lower extremity of welding fixture 11 and are received within suitable openings in platform 13 as the platform is raised, thereby aligning the platform within the fixture.

The flanges of inner rails 7 and outer rails 8 are held together along the position of the longitudinal seam 9 by a plurality of clamps 23. As best seen in Figs. 1 and 5, each of the clamps 23 comprises a channel member 24 having the web portion thereof secured to the inner surface of side plate 15 of the welding frame. Each flange of the channel 24 carries a pair of vertically aligned bearing guides 25 which receive a rod 26. A bifurcated jaw plate 27 is disposed between the flanges of channel member 24, and the plate 27 is also provided with bearing guides 28 which are disposed in vertical alignment with guides 25 and receive the rod 26. Springs 29 are disposed between the bearing guides 28 and nuts 30 threaded on the corresponding ends of the rods 26 and serve to resiliently support the plate 27 in the channel member 24.

The upper end portion of a plate 27 terminates in a fixed jaw 31 which engages the upper flange of the outer channel member 8 of side rail 2, while a movable lower jaw 32 is pivotally connected to plate 27 and engages the lower flange thereof. Suitable gripping blocks may be disposed on the clamping surfaces of the jaws 31 and 32.

The movable jaw 32 is adapted to be pivoted upwardly to engage the side rail 2 during welding and to be pivoted downwardly and outwardly after welding to permit the vehicle frame 1 to be removed from the welding fixture 11.

This movement of jaw 32 is accomplished by pivotally connecting the jaw to the plate 27 through a pair of arms 33. The jaw 32 is actuated by means of hydraulic cylinder 34 which is trunnioned within the lower extremity of the bifurcated plate 27. The ram 35 of the cylinder 34 is connected to the lower jaw 32. With this construction, the jaw 32 is moved upwardly and inwardly as the ram 35 is extended to clamp the side rail 2 between the jaws 31 and 32. After the welding is completed the ram 35 is withdrawn causing the lower jaw 32 to be pivoted outwardly and downwardly, out of the downward path of travel of the side rails 2.

It is essential that the vehicle frame 1 be accurately aligned with respect to the welding heads during the welding operation. Each individual vehicle frame 1 has slight bends or irregularities therein and in order to standardize the general configuration of the vehicle frame a plurality of aligning devices are associated with the fixture which serve to generally align the frame with the welding units 12. As shown in Figs. 1 and 2, these aligning devices may take the form of dowels 36 carried by brackets 37 which are secured to the side plates 15 of the welding fixture. Dowels 36 are received within openings in the kick-up portion 6 of the side rails as the vehicle frame is elevated into the welding fixture 11.

Similarly, dowels 38 secured to brackets 39 which are connected to side plates 15 are received within suitable openings in the body brackets 5 as the vehicle frame is elevated into position within the welding fixture 11. Pilot brackets 40 may also be provided on the end plate 16 to engage the rear end of the side rails 2. In addition to the aligning devices described herein, other centering and aligning mechanisms may be employed to position the vehicle frame within the fixture 11 for welding.

Each of the welding units 12 which serves to weld spaced lengths of the seams 9 of the side rails 2 comprises generally a welding head 41, an individual drive unit 42 which supports and moves the welding head along a flexible track 43 in a path corresponding to the theoretical contour of the side rail to weld the seam, and a welding head guide mechanism 44 which connects the welding head and the corresponding drive unit and permits the head to move relatively to the drive unit to follow vertical and lateral irregularities in the seam 9 which depart from the theoretical contour thereof.

As best shown in Fig. 5, each welding head 41 guides and feeds a consumable electrode 45 toward the seam 9. The consumable electrode 45 which is contained on a reel, not shown, passes through a guide bracket 46 attached to the welding head and immerges from the nozzle 47 of the head adjacent the seam. Electrical energy is supplied to the electrode through lead 48 so that an arc is established between the electrode 45 and the side rail 2. The electrode 45 is consumed and is fed toward the side rail at a predetermined rate to provide the desired rate of electrode consumption.

Each welding head 41 is guided in movement on track 43 by a pair of rollers 49 and 50 which are rotatably secured to a bracket 51 on the welding head. The roller 49 is adapted to ride on the upper surface of track 43 while the roller 50 is biased into engagement with the side surface of the track by a mechanism hereinafter described.

The drive units 42, which support and move the corresponding welding heads 41 along the side rail, ride on separate rail sections 52. Each of the rail sections 52 is shaped in conformity with the theoretical contour of a portion of the side rail and the rail sections are disposed parallel to the corresponding portion of the side rail in a plane therebeneath.

Each rail section 52 is secured to the outer surface of a generally vertical plate 53 adjacent the top edge thereof by a plurality of screws 54. The plate 53 is adjustably secured in a flatwise relation to the support plate 19 which rests on supporting structure 10. The connection between plates 53 and 19 is accomplished by screws 55 which extend through slotted openings in plate 53 and are threadedly engaged within apertures in plate 19. Each rail section 52 is shaped in conformity to the curvature of the corresponding portion of the side rail. Taken in combination, the rail sections form a rail structure which is shaped in general conformity to the side rail 2 and extends co-extensively with the seam to be welded.

Each drive unit includes a drive housing 56 which houses and supports a motor, a speed reducing mechanism, a braking unit and a clutch mechanism which are of conventional construction and do not form a part of the present invention.

To connect each drive housing 56 to the corresponding welding head guide mechanism 44, a shaft housing 57 is secured to the drive housing and an upstanding support plate 58 is attached to the shaft housing. The support plate 58 supports the welding head guide mechanism 44 which in turn carries the corresponding welding head 41. With this construction movement of the drive unit 42 along the rail section 52 results in a corresponding movement of the welding head guide mechanism 44 and the attached welding head 42 along the side rail 2.

To mount the drive units 42 on the respective rail sections 52, the upper surface of each rail section is provided with a longitudinally extending recess 59 which receives a generally curved rack 60. As shown in Figs. 18 and 19, the rack 60 is centered within the recess 59 by a series of conical point screws 61 which are threaded within suitable openings in the rail and are received within conical-shaped sockets 62 formed in the side surfaces of the rack.

The drive shaft 63 of each drive unit is journaled within shaft housing 57 and carries a gear 64 which meshes with the rack 60. The motor of each drive unit is connected to a suitable source of electrical energy, not shown, and on operation of the motor, the shaft 63 is driven to move the corresponding gear 64 along the rack 60.

To guide the drive unit 42 in travel on rack 60, a pair of rollers 65 and 66 are secured to the shaft 63 on either side of gear 64 and ride on the upper surfaces of rail section 52 that border the rack 60. This is best shown in Figs. 5 and 18. Lateral displacement of the roller 65 on rail section 52 is prevented by the pair of side flanges 67 on the roller. The flanges 67 engage the side surfaces of the rail section and prevent the roller 65 from moving laterally with respect to the rail section.

The drive unit 42 is also guided in movement on rack 60 by means of roller 68 which is rotatably secured to a shaft 69 which extends outwardly from the drive housing. The roller 68 is adapted to ride on the lower surface of rail section 52 and is provided with side flanges 70 which are similar in structure and function to flanges 67 on roller 65.

To provide a three-point support for the drive unit on the rail section, a third roller 71 is rotatably secured to one arm of a crank 72 as best shown in Fig. 18. The crank is fulcrumed on shaft 69. The roller 71 is provided with side flanges 73, similar in function to side flanges 67 on roller 65, and is biased into contact with the lower surface of rail section 52 by a spring 74. The spring 74 is disposed around a rod 75 and one end of the rod is secured to the bifurcated lower arm of crank 72. The other end of rod 75 threadedly receives a spring seat 76, and the spring 74 is interposed between the spring seat 76 and a second spring seat 77 which bears against a bracket 78. The bracket 78 extends downwardly from the shaft housing 57 and is provided with a suitable opening to receive the rod 75.

The force of the spring 74 tends to pivot the crank 72 in a clockwise direction and urges the roller 71 into contact with the rail section 52 to insure a three-point or triangular support for the drive unit on the rail section at all times.

As the center of gravity of the drive unit 42 is displaced laterally from the corresponding rail section, the weight of the drive unit tends to produce a moment arm about the rail section which puts a stress on the roller flanges 67, 70 and 73. To limit the stress on these flanges, a roller 79 is attached to the lower end portion of bracket 78 and is adapted to ride on the vertical leg of an angle bar 80. The bar 80 is secured to plate 53 and is shaped in conformity with the curvature of the corresponding rail section. In addition, a guide shoe 81 is attached to bracket 78 and is disposed on the opposite side of bar 80 from the roller 79. The guide shoe 81 prevents outward displacement of the drive unit and bracket 78.

To control the movement of the drive units 42 on the rail sections a pair of limit switches 82 and 83 are secured to plate 53 beneath the rail sections, as shown in Fig. 4. The switches 82 and 83 are disposed to be contacted by the rollers 68 and 71 respectively as the drive unit approaches the ends of its path of travel. As the drive unit and attached welding head reach the end of travel roller 71 engages switch 83, as indicated by the dash line in Fig. 4, to actuate the braking mechanism to stop movement of the welding head and cut off the electrical current to the electrode.

On the reverse travel of the drive unit after the vehicle frame has been removed from the welding unit, roller 68 engages switch 82 to actuate the braking mechanism and stop movement of the welding head.

The rail sections 52 can be adjusted vertically by means of a series of threaded studs 84 which are threadedly received within lugs 85 on support plate 19 and engage a series of ears 86 secured to plate 53. By threaded adjustment of studs 84, the vertical height of rail sections 52 can be varied and vertical position of welding heads 41 can thereby be correspondingly varied. The slotted openings in plate 53 which receive screws 55 permit the vertical movement of the plate.

As the rail sections 52 are shaped to conform to the theoretical contour of a portion of the side rail 2, the drive units 42 travel in a similar path. However, the actual contour of the side rails and the seams 9 will generally depart from the theoretical contour due to small irregularities or bends in the side rails. Thus, the welding head guide mechanisms 44 permit each welding head 41 to move freely in both a lateral and vertical direction with respect to the corresponding drive unit to enable the welding heads to follow irregularities in the seams 9 as directed by track 43.

Each guide mechanism 44 consists of a frame 87 having a depending support plate 88 which is secured flatwise to the plate 58 extending upwardly from shaft housing 57.

Each welding head 41 is permitted to move freely in relation to the corresponding drive unit 42 by slidably connecting the welding head to the frame 87. This is accomplished by securing one end of a tube 89 to the welding head. The tube 89 extends concentrically within a cylinder 90, and the other end of the tube is pivotally connected to a bifurcated cross arm 91 which is attached across the end of cylinder 90.

The cylinder 90 is mounted for lateral movement within the frame 87 by means of a plurality of rollers 92 which are rotatably attached to frame 87 and ride on the upper and lower surfaces of longitudinally extending ears 93 which are provided on the outer surface of the cylinder. In addition to rollers 92, rollers 94 ride against the side surface of ears 93 to prevent lateral displacement of the cylinder. With this construction the cylinder 90 and the attached welding head 41 are permitted to move laterally to follow irregularities in the seam as indicated by the track as the welding head travels longitudinally along the side rail 2 during welding.

The cylinder 90 and the attached welding head 41 are biased outwardly to insure engagement of roller 50 with track 43 by a spring 95. The spring 95 is disposed around rod 96. The outer end of rod 96 is attached between the lower extremities of bifurcated arm 91 while the inner end of the rod extends freely through a bracket 98 which is carried by the frame 87. The spring 95 is interposed between a spring seat 99, which is located adjacent arm 91, and bracket 98. The force of spring 95 urges the cylinder 90 outwardly with relation to frame 87 and thereby biases the welding head roller 50 into engagement with the side surface of track 43.

In many cases the weld seam 9 may have deformations or irregularities that may cause the seam to be displaced vertically from its usual contour. To permit the welding head 41 to follow these vertical irregularities, the cylinder 90 is provided with a substantially larger diameter than that of tube 89 so that the tube may pivot freely in a vertical direction within the cylinder. The welding head 41 which is secured to the tube will thereby be able to move vertically in accordance with small vertical variations in contour of the seam 9 as evidenced by the track 43.

The tube 89 is guided for vertical pivotal movement within the cylinder 90 by a pair of side plates 100 which are secured to diametrically opposite locations on the outer surface of the tube at the inner end thereof. A pair of rollers 101 are rotatably secured to arcuate blocks 102 which are welded within the inner end of cylinder 90. The rollers 101 ride on the outer surface of side plates 100 and serve to guide the tube 89 in vertical pivotal movement.

The weight of the welding head 41 is balanced by a spring 103 which is seated on the horizontal leg of an angle shaped support 104. The vertical leg of support 104 is secured to the cylinder 90. The upper end of a spring 103 bears against a seat 105 which is threadedly engaged with the upper end of a rod 106. Rod 106 extends downwardly through a suitable opening in the horizontal leg of support 104 and the lower end of rod 106 is bifurcated and is connected to the tube 89 by means of a tongue 107 which is secured within the lower end of the rod by a pin 108. The lower end of tongue 107 is secured to tube 89. With this construction the force of spring 103 acting upwardly tends to bias the welding head 41 upwardly so that the full weight of the welding head is not on the flexible track 43. The force of the spring 103 may be varied by adjustment of the threaded connection between the rod 106 and the spring seat 105.

To indicate lateral irregularities in the seam 9 to be welded which depart from the theoretical contour of the same, a plurality of finger units 109 are employed which engage the seam on the upper surface of side rail 2 and automatically position the electrodes 45 carried by welding heads 41 in welding alignment with the seam. The finger units 109 carry the flexible track 43 and bend the same in conformity with the contour of seam 9. The welding heads 41 ride on track 43 and the electrodes 45 are thereby positioned properly with respect to the seam at all times.

Each of the finger units 109 comprises a generally horizontal shaft 110 having a head 111 which terminates in a finger 112. The finger 112 is adapted to be moved outwardly into engagement with the seam 9 to be welded. The shaft 110 is slidably mounted in a sleeve 113 which supports track 43 and the inner end of the sleeve is slidably mounted between a pair of trunnion arms 114 which are fulcrumed, as indicated by 115, in a pair of spaced vertical support plates 116. With this construction, the shaft 110 and sleeve 113 can be pivoted about the fulcrum 115. The plates 116 are connected by an angle plate 117 which is secured to center plate 17 of welding fixture 11.

To support the track, each of the sleeves 113 is provided with a peripheral recess adjacent the outer end thereof and a collar 118 is secured within the recess. Each of the collars 118 carries an upstanding pin 119. The track 43 is composed of a series of segments 120 which are pivotally interconnected at their adjacent ends by the pins 119 to permit lateral pivotal movement of the segments about the connecting pins. This construction permits the track 43 to be flexed or bent about the pins 119.

The shaft 110 is actuated laterally to bring the finger 112 into contact with the seam 9 by means of a bifurcated bell crank 121 which is fulcrumed between plates 116. Each of the lower legs of the crank 121 is pivotally connected to a block 122 by means of a pin 123. The blocks 122 are slidable within vertically extending slots 124 formed in a collar 125 which is secured about sleeve 113. The slots 124 permit the crank 121 to be pivoted through an arcuate path while the collar 125 moves in a straight horizontal path.

The collar 125 is connected to the sleeve 113 by a pin 126 which extends through aligned openings in the shaft 110 and collar 125 and is slidable within a pair of longitudinal slots 127 in sleeve 113.

With this construction, initial pivotal movement of the crank 121 will move the shaft 110 outwardly toward the seam 9 relative to the sleeve. However, a subsequent predetermined amount of pivotal movement of crank 121 will result in the sleeve 113 moving outwardly with the shaft 110. This delayed action is brought about by the engagement of collar 125 with a second collar 128 which is secured about the sleeve 113. Thus, as the crank 121 is pivoted clockwise, the collar 125 and shaft 110 are initially moved outwardly until pin 126 engages the end of slot 127 and then the sleeve 113 will move outwardly with the shaft.

The crank 121 is actuated by means of a hydraulic cylinder 129 which is secured between the plates 116. A piston rod 130 carried by the piston 131 of cylinder 129 extends downwardly and the lower end portion of the rod 130 is slidably received within a block 132. The block 132 is pivotally attached to the horizontal leg of the crank 121.

To provide a resilient connection between the piston rod 130 and the crank 121 so that the finger 112 may resiliently engage the seam 9, a spring 133 is interposed between block 132 and spring seat 134 which is threadedly engaged on the central portion of rod 130. The lower extremity of rod 130 is provided with a stop nut 135. To move the finger 112 toward the seam, hydraulic fluid is introduced into cylinder 129 through opening 136, and the piston 131 and rod 130 are thereby moved downwardly compressing spring 133. Downward movement of rod 130 will not actuate the crank 121 to move shaft 110 and finger 112 until the spring 138 is substantially compressed.

To withdraw the finger 112 from seam 9, hydraulic fluid is introduced into the lower portion of the cylinder 129 through opening 137, thereby moving the rod 130 upwardly and releasing the compression of spring 133. Additional upwardly movement of rod 130 will bring stop nut 135 into engagement with block 132 to pivot crank 121 and draw the finger 112 inwardly.

The upward stroke of piston 131 is limited by the engagement of the piston with a stud 138 which is threadedly engaged within cylinder 129. The length of the piston stroke can be varied by the threaded adjustment of the stud 138.

After the fingers 112 engage the seam 9 and the track is accordingly positioned, the fingers are retracted so that the weld can be made. The sleeves, however, are locked in position and are not retracted so that the track 43 which is carried by the sleeves will remain a given distance from the seam 9.

Each sleeve 113 is locked against inwardly lateral movement by a pawl 139 which is pivotally connected between the lower extremities of trunnion arms 114. The locking pawl 139 is adapted to engage a wear plate 140 which is secured to a block 141 that is removably attached to the inner end of sleeve 113. The block 141 is provided with ways 142 which slidably receive guides 143 formed on trunnion arms 114, thereby permitting the sleeve 113 and block 141 to slide relative to the trunnion arms 114. The upper arcuate surface of pawl 139 wedges against the wear plate 140 and locks the sleeve against inward longitudinal movement.

The pawl 139 is biased into wedging engagement with the wear plate 140 by a spring 144 which is contained within a hollow cap 145. The spring 144 and cap 145 are slidably disposed within a recess 146 formed in a base member 147 which connects plates 116. The force of the spring 144 urges the cap 145 into bearing engagement with the outer edge of pawl 139 and thereby biases the pawl into locking engagement with the wear plate 140.

When the vehicle frame 1 is moved downwardly out of the welding fixture 11 after welding, the weight of the shaft 110 tends to pivot the shaft, the sleeve 113 and trunnion arms 114 about the fulcrum 115, as is shown in Fig. 11. The pawl 139 is released from wedging engagement with wear plate 140 as the shaft 110 pivots downwardly. As the shaft 110 pivots downwardly, the sleeve 113 and trunnion arms 114 are correspondingly pivoted. The pivotal movement of arms 114 causes pawl 139 to engage stud 148 which releases the wedging engagement between the pawl and the wear plate 140, as shown in Fig. 11.

When shaft 110 pivots downwardly, the position of pivotal connection of pawl 139 with trunnion arms 114 has been displaced an angle A from its normal position. This displacement brings the inner edge portion of the pawl 139 into engagement with stud 148 to release the locking engagement of the pawl 139.

To move the sleeve 113 inwardly, away from side rail 2, after the sleeve has been released from locking engagement, a spring 149 is disposed around a rod 150 and the outer end of the rod is threadedly engaged with a depending arm 151 which is secured to the outer end of shaft 110. A spring seat 152 is threadedly engaged on rod 150 and the spring 149 is interposed between the seat 152 and a cup-shaped recess 153 formed in collar 128. After release of the sleeve from locking engagement, the spring 149 tends to urge the sleeve inwardly as shown in Fig. 11.

Rotation of the collar 128 and finger 112 is prevented by stud 154 which is threadedly engaged in an opening in the base member 147. The upper end of the stud 154 is received within a slot 155 formed in the lower portion of collar 128 and prevents rotation of the collar about the shaft 110.

Before the vehicle frame 1 is elevated into position within the welding fixture 11, the finger units 109 generally assume the inclined position shown in Fig. 11. In this position the weight of the shaft 110 tends to pivot the shaft and sleeve about the fulcrums 115 so that the shaft is disposed at a slight angle to the horizontal. The downward pivotal movement of the shaft 110 and sleeve 113 is limited by the engagement of collar 128 with stop 156 which is secured to base member 147. The degree of pivotal movement of the shaft can be varied by adding or removing shims 157 from behind the stop. By increasing the number or thickness of shims 157, the degree of pivotal movement of the shaft 110 and sleeve 113 will be decreased.

As the vehicle frame is elevated, the side rail 2 of the frame 1 engages the finger 112 and moves the finger unit 109 to a generally horizontal position as shown in Fig. 12. With the finger unit in a substantially horizontal position, the cylinder 129 is actuated to pivot crank 121 and move shaft 110 outwardly toward the seam 9. The pin 126 engages the end of slot 127 to move sleeve 113 outwardly with the shaft until the finger 112 engages the seam. The track 43 which is carried by the sleeve 113 is flexed and thereby positioned a given distance from the seam.

At this time, the locking pawl 139 is in wedging engagement with the wear plate 140 to lock sleeve 113 against inward longitudinal movement and thereby maintain the track in proper spaced relation with the seam 9.

The finger 112 is then retracted through operation of cylinder 129. The shaft 110 moves relatively within the sleeve 113 as the sleeve is locked by pawl 139.

After the seam 9 is welded, the vehicle frame 1 is lowered causing shaft 110 and sleeve 113 to pivot downwardly about the fulcrum 115. This pivotal movement of the shaft 110 and sleeve 113 unlocks the pawl 139, and the spring 149 then moves the sleeve 113 inwardly as shown in Fig. 11.

The finger unit is then in readiness for a second welding operation.

To begin operation of the apparatus, each drive unit 42 and attached welding head 41 is moved to the end point of its respective length of travel on the rail section 52.

The fingers 112 are in the downwardly inclined position and are engaged and raised by the side rails 2 of the frame 1 as the frame is elevated into the welding fixture 11.

The platform 13 is then locked in the welding fixture and the vehicle frame 1 is aligned for welding by the engagement of dowels 36 and 38 with the corresponding openings in the vehicle frame.

Side rails 2 are then engaged by clamps 23 to bring the flanges of the inner rail 7 and outer rail 8 into contiguous relation for welding.

After the vehicle frame 1 is properly aligned for welding within the welding fixture, each finger unit 109 is actuated through operation of the corresponding hydraulic cylinder 129 to move the fingers 112 outwardly into engagement with the seam 9 on the upper surface of the side rail. The sleeves 113 which carry the flexible track 43 are moved outwardly with corresponding fingers to position the track a given distance from the seam at all points throughout the length of track.

With the track 43 properly positioned with respect to the seam 9, the fingers 112 are then withdrawn from the seam. The sleeve 113 and the track 43 are locked by pawls 139 so that the track will not move with the withdrawal of the fingers.

Each drive unit 42 is then actuated to move the drive unit and the attached welding head 41 on rail sections 52, and electric energy is supplied to the welding head to establish an arc between the electrode 45 and the side rail 2 to weld the seam as the welding head moves along the side rail.

Each welding head is free to follow lateral irregularities in the seam 9 as evidenced by the track 43 due to the slidable connection between the cylinder 90 and the supporting frame 87.

The welding head is also free to follow vertical irregularities in the seam as evidenced by the track due to the pivotal connection of tube 89 and cylinder 90.

The welding heads move along the track 43 to weld the seam 9 until the roller 71 contacts limit switch 83 to energize the braking mechanism to stop movement of the drive unit and also to cut off the electrical energy to the electrode.

The present invention provides an apparatus for automatically welding the seam on a generally curved, elongated article such as the side rail of a vehicle frame.

As both the drive unit and welding head travel in a path corresponding to the curvature of the seam to be welded, the electrode is maintained at a constant and proper angle to the seam at all times.

The apparatus compensates for minor irregularities in the contour of the seam which depart from the theoretical or standard contour so that the welding electrode will follow both lateral and vertical irregularities in the seam and thereby insure sound uniform welds.

Various modes of carrying out the invention are contemplated as within the scope of the accompanying claims particularly pointing out and distinctly claiming the subject matter which is regarded as the invention.

I claim:

1. An apparatus for welding the longitudinal seam of an elongated article comprising, a welding fixture adapted to receive and align the frame for welding, a flexible track having a curvature in general conformity with the longitudinal contour of the side rail to be welded, welding head means disposed to ride along said track, aligning means connected to the welding fixture and supporting said track and adapted to engage the seam of the side rail and position the track a given distance from said seam, and drive means for driving the welding head means on said track with said welding head means serving to weld the seam as the welding head means moves along the track.

2. An apparatus for welding the longitudinal seam of an elongated article comprising, a supporting structure, a welding fixture carried by the supporting structure and adapted to receive and align the vehicle frame for welding, a flexible track having a contour substantially in conformity with the side rail of the vehicle frame, welding head means disposed to ride on said track and weld the seam, means supporting the track and for positioning the track a given distance from the seam throughout the length of the track, and drive means for moving the welding head means on the track to weld said seam.

3. An apparatus for welding the longitudinal seam of the side rail of a vehicle frame comprising, a welding fixture to receive and align said frame for welding, a flexible track having a curvature in general conformity with the contour of the side rail, welding head means disposed to ride on said track, means for flexing the track and positioning the track a given distance from the seam, a fixed rack having a configuration substantially in conformity with the longitudinal contour of the side rail, a driving member to engage the rack and move thereon, means interconnecting said driving member and the welding head means to move the welding head means along said track in accordance with movement of the driving member on the rack to weld the seam, and means associated with said interconnecting means to effect free lateral movement of the welding head means with respect to the rack and permit the welding head means to follow the lateral irregularities in the seam as evidenced by said track.

4. An apparatus for welding the longitudinal seam of the side rail of a vehicle frame comprising, a welding fixture adapted to receive and align the frame for welding, a flexible track having a curvature in general conformity with the contour of the side rail, welding head means disposed to ride on said track, means for flexing the track and positioning the track a given distance from the seam, a fixed guide member shaped substantially in conformity with the longitudinal contour of the side rail, a driving member to engage the guide member and move thereon, means interconnecting said driving member and the welding head means to move said welding head means along said track in accordance with movement of said driving member and weld the seam, means associated with said interconnecting means to effect free lateral movement of the welding head means with respect to the guide member and permit the welding head means to follow the lateral irregularities of the seam as evidenced by said track, means associated with said interconnecting means to effect free vertical movement of the welding head means with respect to the guide member to permit the welding head means to follow vertical irregularities in said track, and means associated with the interconnecting means for balancing the weight of the welding head means.

5. An apparatus for welding a longitudinal seam of an elongated metal article comprising, a welding fixture adapted to receive and align the article for welding, a flexible track shaped substantially in conformity with the longitudinal contour of the article and extending generally co-extensively therewith, welding head means disposed to ride on said track and weld the seam, a finger member connected to the welding fixture, a sleeve carrying the track and slidably disposed with respect to said finger member, actuating means adapted to move the finger member and the sleeve laterally to engage the finger member with the seam and position the track a given distance from said seam, means for withdrawing the finger member from the seam and for locking the sleeve and track against movement with said finger member, drive means supporting the welding head means and moving the same on the track with said seam being welded by the welding head means as the same moves on the track, means associated with the drive means for effecting free lateral movement of the welding head means with respect to the drive means to permit the welding head means to follow the lateral irregularities in the seam as evidenced by the track, and means for unlocking the sleeve and the track as the article is removed from said welding fixture after the welding is completed.

6. An apparatus for welding a longitudinally extending seam of a metal article comprising, a welding fixture adapted to receive and support the article for welding, a flexible track shaped substantially in conformity with the longitudinal contour of the article, welding means disposed to ride on said track and weld the seam, means for positioning the track a given distance from the seam at spaced locations throughout the length of the seam, a fixed rack having a configuration generally in conformity with the longitudinal contour of the track and extending co-extensively therewith, a gear member intermeshing with said rack, drive means driving the gear member on the rack, a support member carried by the gear member, a sliding member slidably mounted on said support member and connected to said welding means, said sliding member being free to slide laterally with respect to said track to permit the welding means to follow lateral irregularities in the seam as evidenced by the track, and means associated with said sliding member for free vertical movement of the welding means with respect to the support member to permit the welding means to follow vertical irregularities in said seam as indicated by the track.

7. An apparatus for welding a longitudinally extending seam of a metal article comprising, a welding fixture adapted to receive and support the article for welding, a flexible track having a curvature in general conformity with the longitudinal contour of the seam to be welded, welding means riding on said track, means connected to said welding fixture for flexing the track and positioning the track a given distance from the seam throughout the length of the seam, drive means adapted to move longitudinally along the article, a tubular member mounted on the drive means to effect free movement of the tubular member with relation to said drive means in a direction transverse to the seam to be welded and to effect positive transfer of motion between the drive means and the tubular member in a direction longitudinal of said seam, and an elongated member disposed within said tubular member and having one end attached to said welding head and the other end pivotally secured to said tubular member, said drive means serving to drive the welding means on the track to weld the seam with said tubular member being adapted to move laterally with respect to the drive means to follow lateral irregularities in the seam as evidenced by said track and with said elongated member being adapted to pivot vertically with respect to the tubular member to permit the attached welding means to follow vertical irregularities in the track.

8. An apparatus for welding a longitudinal seam in a generally curved elongated article comprising, a welding fixture for positioning and aligning the article for welding, a series of rail sections with each of said sections having a contour corresponding to the longitudinal contour of a portion of said article, a separate drive unit mounted on each of said rail sections and movable thereon, welding means connected to each drive unit with each welding means being adapted to move along a successive portion of the seam to weld the same as the corresponding drive unit moves on the rail section, a plurality of gauge members connected to the welding fixture and disposed at intervals along the length of the fixture and adapted to engage the seam to be welded, an indicating member connected to the gauge members and extending substantially the length of the fixture to indicate the longitudinal contour of the seam as determined by said gauge members, said welding means being connected to the indicating member and being adapted to follow the contour of the indicating member as the welding means is moved along the seam by said drive unit, means associated with said welding means for effecting freedom of movement of said welding head means with respect to said drive unit in a direction lateral to the seam to permit said welding means to follow lateral irregularities in the indicating member, and second means associated with said welding head means for effecting freedom of movement of said welding means with respect to the drive unit in a direction vertical to the seam to permit said welding means to follow vertical irregularities in the indicating member.

9. An apparatus for welding a longitudinal seam in a generally curved elongated article comprising, a welding fixture for positioning and aligning the article for welding, a series of rail sections with each of said sections having a contour corresponding to the longitudinal contour of a portion of said article, a separate drive unit mounted on each of said rail sections and movable thereon, welding means connected to each drive unit with each welding means being adapted to move along a successive portion of the seam to weld the same as the corresponding drive unit moves on the rail section, a plurality of gauge members connected to the welding fixture and disposed at intervals along the length of the fixture and adapted to engage the seam to be welded, and an indicating member connected to the gauge members and extending substantially the length of the fixture to indicate the longitudinal contour of the seam as determined by said gauge members, said welding means being connected to the indicating member and being adapted to follow the contour of the indicating member as the welding means is moved along the seam by said drive unit.

10. An apparatus for welding a longitudinal seam in a generally curved elongated article comprising, a welding fixture for supporting and aligning the article for welding, a series of rail sections with each of said sections having a contour corresponding to the longitudinal contour of a portion of said article, a separate drive unit mounted on each of said rail sections and movable thereon, welding means connected to each drive unit with each welding means being adapted to move along a successive portion of the seam to weld the same as the corresponding drive unit moves on the rail section, a plurality of gauge members connected to the welding fixture and disposed at intervals along the length of the article to engage the seam to be welded, a sectionalized track carried by the gauge members and formed of a plurality of pivotally connected sections, said track having a contour shaped in conformity with the article and being adapted to be flexed at the pivotal connections between the sections by said gauge members to indicate the contour of the seam to be welded, said welding means being adapted to ride on the track to follow the contour of the seam as indicated by the track as said welding means is moved along the seam by said drive unit, and means associated with the welding means for effecting a freedom of movement of said welding means with respect to the corresponding drive unit in both lateral and vertical directions to the article to permit the welding means to follow the contour of the track.

11. An apparatus for welding a longitudinal seam in a generally curved elongated article comprising a welding fixture, means for positioning and aligning the article in said welding fixture, a series of rail sections with each of said sections having a contour corresponding to the longitudinal contour of a portion of said article and disposed generally parallel thereto, a separate drive unit mounted on each rail section and movable thereon, a support member secured to each drive unit, a carriage slidably mounted on each support member and freely movable with respect to the support member and drive unit in a lateral direction toward and away from the seam to be welded, welding head means pivotally connected to each carriage and freely pivotable with respect to the corresponding drive unit in a direction vertical to the seam, a plurality of gauge members connected to the welding fixture and disposed at intervals along the length of the article to engage the seam to be welded, a sectionalized track carried by the gauge members and formed of a plurality of pivotally connected sections, said track being shaped in general conformity with the longitudinal contour of the article and disposed to be flexed at the pivotal connections between the sections by said gauge members to indicate the contour of the seam to be welded, said welding head means being adapted to ride on the track to follow the contour of the seam as indicated by the track as said welding head means is moved along the article by said drive unit with the slidable mounting of said carriage on said support member and the pivotal connection between the welding head means and the carriage permitting the welding head means to freely follow the contour of the track, and means associated with each carriage for balancing the weight of the corresponding weld head means to remove a portion of the weight of said welding head means from the track.

12. An apparatus for welding a longitudinal seam in an elongated metal article comprising, a welding frame to receive and hold the article during welding, a flexible track shaped substantially in conformity with the longitudinal contour of the article, a finger member connected to the welding frame, a sleeve supporting the track and slidably disposed with respect to said finger member, actuating means disposed to move the finger and the sleeve laterally to engage the finger member with the seam and position the track a given distance from said seam, means for withdrawing the finger member from the seam and for locking the sleeve and track against movement with said finger member, a rail having a contour corresponding to the longitudinal contour of said article, a drive unit supported on said rail and movable thereon, welding means connected to the drive unit and adapted to ride on the track to weld the seam as the drive unit moves on the rail, and means responsive to the removal of the article from said welding frame after welding is completed for unlocking the sleeve and the track.

13. An apparatus for driving a welding unit along an elongated article to weld a longitudinal seam thereon which comprises, a rail having a contour corresponding generally to the longitudinal contour of said article, a rack shaped complementary to the rail and secured to the upper surface thereof, a drive unit supporting the welding unit and having a drive shaft extending therefrom, a gear member mounted on said shaft and engageable with the rack, said gear member being driven by said drive unit to move the gear member on the rack and thereby move the drive unit and the attached welding unit along the rail to weld the seam, a pair of guide rollers connected to the drive unit and disposed to ride on the lower surface of the rail, said gear member and said rollers being disposed in a triangular arrangement with respect to each other to provide a three-point support for the drive unit on the rail, means for biasing at least one of said rollers into contact with the rail to resiliently maintain said three-point support, and means for preventing pivotal movement of the drive unit about the rail.

14. An apparatus for driving a welding unit along an elongated article to weld a longitudinal seam therein which comprises, a rail having a contour corresponding generally to the longitudinal contour of said article, a rack shaped complementary to the rail and secured to the upper surface thereof, a drive unit supporting the welding unit and having a drive shaft extending therefrom, a gear member mounted on said shaft and engageable with the rack, said gear member being driven by said drive unit to move the gear member on the rack and thereby move the drive unit and the attached welding unit along the rail to weld the seam, a guide member disposed to ride on the lower surface of the rail, shaft means rotatably connecting said guide member to the drive unit, a crank fulcrumed to said shaft means, a second guide member rotatably secured to an end of said crank, and biasing means connected to the other end of the crank and disposed to bias said second guide member into contact with the lower surface of the rail, said gear member and said guide members being disposed in triangular relation with respect to each other to provide a three-point support for said drive unit on said rail.

15. An apparatus for driving a welding unit along an elongated article to weld a longitudinal seam therein which comprises, a rail having a contour corresponding generally to the longitudinal contour of said article, a rack shaped complementary to the rail and secured to the upper surface thereof, a drive unit supporting the welding unit and having a drive shaft extending therefrom, a gear member mounted on said shaft and engageable with the rack, said gear member being driven by said drive unit to move the gear member on the rack and thereby move the drive unit and the attached welding unit along the rail to weld the seam, a pair of guide rollers connected to the drive unit and disposed to ride on the lower surface of the rail, said gear member and said rollers being disposed in a triangular arrangement with respect to each other to provide a three-point support for the drive unit on the rail, a track shaped in conformity with the rail and disposed substantially parallel thereto, and a guide member connected to the drive unit and disposed to ride on the track to prevent pivotal movement of the drive unit with respect to the rail.

16. An apparatus for driving a welding unit along an elongated article to weld a longitudinal seam therein which comprises, a single guide rail having a contour corresponding generally to the longitudinal contour of said article, a drive unit supporting the welding unit and mounted on said guide rail with the center of gravity of said drive unit being offset from a vertical plane passing through said guide rail to produce a moment arm about said guide rail, said drive unit having a driving member engaging said guide rail to move said drive unit along said guide rail and thereby move the welding unit along the article to weld the seam, and means for preventing pivotal movement of said drive unit about said rail.

17. An apparatus for positioning a welding electrode in welding alignment with a seam to be welded in a metal article which comprises, a welding head to carry the electrode, a guide member to support the welding head, a sleeve secured to the guide member, a finger member slidably disposed within the sleeve and extending outwardly therefrom in a lateral direction toward the seam, means for moving the finger member and the sleeve laterally to engage the finger member with the seam and position the guide member in a given distance from the seam, means for withdrawing said finger member laterally from the seam to remove the finger member from the vicinity of welding, and means for locking the sleeve and guide member against movement with said finger member to maintain said electrode at said given distance from the seam.

18. An apparatus for positioning an automatic welding means in alignment with a seam to be welded in a metal article, which comprises, a flexible track shaped in general conformity with the seam to be welded with the welding means adapted to ride on the track to weld the seam, a support member to carry the track, a finger slidably disposed with respect to the support member and extending outwardly therefrom in a lateral direction toward the seam, means for moving the finger relatively to the support member a predetermined distance toward the seam and for moving the support member and the track with the finger after said finger has moved said predetermined distance to engage said finger with the seam and position the track a given distance from the seam, means for withdrawing said finger member laterally from the seam to remove the finger member from the vicinity of welding, and means for locking the support member and track against movement with said finger member to maintain said welding means at said given distance from the seam, and means for automatically unlocking the support member on completion of welding and for moving the support member and track relatively to the finger in a direction laterally away from the seam to position the track in readiness for a subsequent aligning operation.

19. An apparatus for positioning a welding unit in alignment with a seam to be welded in a metal article which comprises, a welding fixture to receive the article and support the same in welding position, a frame secured to the fixture, a crank fulcrumed on the frame, a finger pivotally connected to one end portion of the crank, a drive mechanism pivotally connected to the other end portion of the crank and adapted to pivot said crank, a support member slidably supporting said finger with said finger extending outwardly from the support member in a lateral direction to the welding fixture toward the seam to be welded, a flexible track carried by the support member and shaped in conformity with the seam to be welded within the welding unit being adapted to ride on the track to weld the seam, said drive mechanism being actuated to pivot the crank in one direction and move the finger and the support member outwardly to bring the finger into engagement with the seam and space the track a given distance from the seam, said drive mechanism being actuated to pivot the crank in the opposite direction to withdraw the finger inwardly from engagement with the seam, means for locking the support member and the track against inward movement with said finger, and means responsive to the removal of the article from the fixture for unlocking the support member and track.

20. An apparatus for positioning a welding unit in alignment with a seam to be welded in a metal article which comprises, a welding fixture to receive the article and support the same in welding position, a frame secured to the fixture, pivotal means fulcrumed to the frame, a support member having one end thereof slidably mounted in said pivotal means, a flexible track carried by said support member and shaped in general conformity with the seam to be welded with the welding unit adapted to ride on the track to weld the same, a finger slidably disposed with respect to the support member and extending outwardly therefrom in a lateral direction toward the seam, the weight of the support member and said finger tending to normally pivot the pivotal means with respect to the frame to position the support member and said finger at a downward angle to a horizontal plane, means for pivoting the support member upwardly to a horizontal plane as the article is received within the welding fixture, a crank pivotally connected to the frame and having one end thereof connected to the finger, an actuating mechanism, means for resiliently connecting said actuating mechanism and the other arm of the crank, said actuating mechanism pivoting said crank in one direction to move the finger and the support member outwardly to bring the finger into engagement with the seam and space the track a given distance from the seam and said actuating mechanism pivoting the crank in the opposite direction to withdraw the finger inwardly from engagement with the seam, wedging means pivotally connected to the pivotal means and disposed to wedgingly engage the support member when the support member is pivoted upwardly to a horizontal plane and lock the support member and track against inward movement with the finger, and means to unlock the wedging engagement between said wedging means and the support member as the support member pivots downwardly on removal of the article from the welding fixture.

21. An apparatus for positioning a welding unit in alignment with a seam to be welded in a metal article which comprises, a welding fixture to receive the article and support the same in welding position, a frame secured to the fixture, a pivot member fulcrumed to the frame, a supporting member having one end thereof slidably mounted in said pivot member, a flexible track shaped in general conformity with the seam to be welded with the welding unit adapted to ride on the track to weld the seam, a support member carrying the track, a finger slidably disposed with respect to the support member and extending outwardly therefrom in a lateral direction toward the seam, the weight of the support member and said finger tending to normally pivot the pivot member with respect to the frame to position the support member and said finger at a downward angle to a horizontal plane, means for elevating the vehicle frame into the welding fixture with the side rail of the frame adapted to engage the finger and pivot the finger and support member to a substantially horizontal position, means for moving the finger and the support member outwardly in a lateral direction toward the seam to engage the finger with the seam and space the track a given distance from the seam, means for withdrawing the finger inwardly from the seam to remove the finger from the area of welding, means for locking the support member and track against inward movement with the finger, and means for unlocking the support member and said track as the vehicle frame is lowered from the welding fixture after welding.

22. An apparatus for positioning a welding unit in alignment with a seam to be welded on a metal article which comprises, a welding fixture to receive the article and support the same in welding position, a series of frames secured to the welding fixture at spaced locations along the length thereof, a support member slidably connected to each frame, a flexible track carried by the support members and shaped in general conformity with the seam to be welded with the welding unit being adapted to ride on the track to weld the seam, said track formed of a series of pivotally connected sections with the positions of pivotal connection positioned adjacent the support members, a finger member slidably connected to each support member, means for moving the finger members and the support members outwardly in a lateral direction toward the seam to engage the finger members with the seam and flex the track at the pivotal connections therein to space the track a given distance from the seam, means for withdrawing the finger members inwardly from the seam to remove the finger members from the area of welding, means for locking the support members and track against inward movement with the corresponding finger members, and means for unlocking the support members and said track as the article is removed from the welding fixture after welding.

23. An apparatus for positioning a welding head unit in alignment with a metal seam to be welded which comprises, a welding fixture receiving the article to be welded and supporting the same in welding position, a flexible track shaped in general conformity with the seam to be welded with the welding head unit being adapted to ride on the track to weld the seam, and means connected to the fixture and responsive to the contour of the seam to be welded for positioning the track a given distance from the seam throughout the length of the track.

24. An apparatus for positioning a welding unit in alignment with a seam to be welded in the side rail of a vehicle frame which comprises, a welding fixture supporting the frame during welding of the seam, a plurality of pivot members pivotally connected to said fixture, a sleeve slidably connected to each pivot member with the weight of the sleeves being adapted to normally pivot the respective pivot members about the position of pivotal connection of said pivot member to said fixture and assume a downwardly inclined position, a finger member slidably disposed within each sleeve, means pivoting the finger member and sleeve upwardly to a horizontal plane as the frame is received in the welding fixture, means separately moving each finger member and the corresponding sleeve toward the side rail of the frame to bring the finger member into engagement with the seam, an upstanding member connected to each sleeve and extending upwardly therefrom, a track supporting and guiding the welding unit in the welding of the seam and formed of a series of individual track sections with adjacent pairs of said sections being pivotally connected to one of said upstanding members to permit the sections to be pivoted about the upstanding member laterally in a direction toward and away from said seam to position the track a given distance from the seam throughout the length of the track as the upstanding members are moved in accordance with movement of the sleeve, means for withdrawing the finger members from the seam to remove the finger members from the welding area, and means responsive to the upward pivotal movement of said sleeve for locking the sleeves and the upstanding members against lateral movement in a direction away from said seam to prevent the track from moving with the withdrawal of said finger members.

25. An apparatus for positioning a welding unit in alignment with a seam to be welded in the side rail of a vehicle frame which comprises, a welding fixture supporting the frame during welding of the seam, a series of sleeves spaced along the length of the fixture and slidably connected thereto, an upstanding member secured to each sleeve, a sectionalized track pivotally connected to the upstanding members and supported by the sleeves, said welding unit being adapted to travel on the track to weld the seam, a finger member slidably disposed within each sleeve, means separately moving each finger member and the corresponding sleeve toward the side rail to bring the finger member into engagement with the seam, said track being pivoted about the upstanding members as the sleeves move toward the seam to position the track a given distance from the seam throughout the length of the track, means for withdrawing the finger members from the seam to remove the finger members from the welding area, and means for locking the sleeves and the track against lateral movement in a direction away from said seam to prevent the track from moving with the withdrawal of said finger members.

26. An apparatus for driving a welding unit along an elongated article to weld a longitudinal seam therein which comprises, a guide rail having a contour corresponding generally to the longitudinal contour of said article, a drive unit to support the welding unit and having a driving member engaging said guide rail to move the drive unit along the guide rail and thereby move the welding unit along the article to weld the seam, and a pair of guide members associated with the drive unit and engaging said guide rail, said guide members disposed in triangular relation to said driving member to provide a three point support for the drive unit on the guide rail.

References Cited in the file of this patent

UNITED STATES PATENTS

| | | |
|---|---|---|
| 1,884,644 | Ford | Oct. 25, 1932 |
| 1,983,321 | Stephens et al. | Dec. 4, 1934 |
| 2,068,166 | Dodge | Jan. 19, 1937 |
| 2,288,032 | Smith | June 30, 1942 |
| 2,724,036 | Hess | Nov. 15, 1955 |